United States Patent
Eisler et al.

(10) Patent No.: US 9,485,308 B2
(45) Date of Patent: Nov. 1, 2016

(54) ZERO COPY VOLUME RECONSTRUCTION

(71) Applicant: NetApp, Inc., Sunnyvale, CA (US)

(72) Inventors: Michael Eisler, Colorado Springs, CO (US); Sisir Shekhar, Bangalore (IN); Tijin George, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 167 days.

(21) Appl. No.: 14/290,089

(22) Filed: May 29, 2014

(65) Prior Publication Data
US 2015/0350315 A1   Dec. 3, 2015

(51) Int. Cl.
*H04L 29/08* (2006.01)
*G06F 3/06* (2006.01)

(52) U.S. Cl.
CPC ......... *H04L 67/1095* (2013.01); *G06F 3/0605* (2013.01); *G06F 3/0614* (2013.01); *G06F 3/0617* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 7,143,307 B1 * | 11/2006 | Witte | ................. | G06F 11/1435 714/6.23 |
| 7,756,832 B1 * | 7/2010 | Mowry | ................. | G06F 9/4446 707/638 |
| 8,078,622 B2 * | 12/2011 | Rabii | ................ | G06F 17/30197 707/704 |
| 8,219,681 B1 * | 7/2012 | Glade | ...................... | G06F 3/06 707/616 |
| 8,234,464 B2 * | 7/2012 | Bish | ..................... | G06F 3/0605 162/155 |
| 8,301,673 B2 * | 10/2012 | Hyer, Jr. | ............... | G06F 3/0614 707/769 |
| 8,327,102 B1 * | 12/2012 | Palsule | ................. | G06F 3/0617 711/162 |
| 8,356,072 B1 * | 1/2013 | Chakraborty | ....... | H04L 67/1097 709/203 |
| 2003/0191810 A1 * | 10/2003 | Muhlestein | ............ | H04L 63/10 709/215 |
| 2005/0114464 A1 * | 5/2005 | Amir | ................... | H04L 67/1097 709/213 |
| 2006/0112247 A1 * | 5/2006 | Ramany | ................ | G06F 3/0605 711/165 |
| 2008/0046538 A1 * | 2/2008 | Susarla | ................... | G06F 3/061 709/217 |

(Continued)

OTHER PUBLICATIONS

Farcas, Emilia. Scheduling multi-mode real-time distributed components. Diss. PhD thesis, Department of Computer Sciences, University of Salzburg, 2006.*

(Continued)

*Primary Examiner* — Ranodhi Serrao
*Assistant Examiner* — James Fiorillo
(74) *Attorney, Agent, or Firm* — Nixon Peabody LLP; Khaled Shami

(57) ABSTRACT

Examples described herein include a data migration system for migrating data between different data storage environments. The data migration system creates a first volume on a first storage system, and creates a logical unit within the first volume. The data migration system then creates a virtual volume on a virtual storage system associated with a second storage system, wherein data stored in the virtual volume is backed by the logical unit on the first storage system. The data migration system then replicates, on the virtual volume, a set of data stored on the second storage system. Upon replicating the set of data onto the virtual volume the virtual storage system may automatically create a copy of the corresponding data in the logical unit of the first volume.

9 Claims, 8 Drawing Sheets

(56) References Cited

U.S. PATENT DOCUMENTS

| | | | | |
|---|---|---|---|---|
| 2008/0104443 | A1* | 5/2008 | Akutsu | G06F 11/2058 714/6.12 |
| 2010/0049917 | A1* | 2/2010 | Kono | G06F 3/0605 711/114 |
| 2011/0153697 | A1* | 6/2011 | Nickolov | G06F 9/4856 707/827 |
| 2012/0254567 | A1* | 10/2012 | Umbehocker | G06F 3/0604 711/162 |
| 2012/0310892 | A1* | 12/2012 | Dam | G06F 17/30156 707/659 |
| 2013/0138764 | A1* | 5/2013 | Satapathy | G06F 9/45558 709/214 |
| 2013/0290627 | A1* | 10/2013 | Nazari | G06F 3/0617 711/114 |
| 2014/0025770 | A1* | 1/2014 | Warfield | G06F 15/17331 709/213 |
| 2014/0095826 | A1* | 4/2014 | Rajagopal | G06F 3/0605 711/170 |
| 2014/0195636 | A1* | 7/2014 | Karve | G06F 3/0619 709/215 |
| 2015/0121134 | A1* | 4/2015 | Wipfel | G06F 11/2094 714/6.31 |
| 2015/0205722 | A1* | 7/2015 | Chiu | H04L 67/2842 714/4.11 |
| 2015/0286439 | A1* | 10/2015 | Takagi | H04L 67/06 711/162 |

OTHER PUBLICATIONS

Torhonen, Ville. "Designing a Software-Defined Datacenter." (2014).*

Evans, Chris "Has NetApp Reached a Strategic Inflection Point" Apr. 14, 2014.*

* cited by examiner

ZERO COPY VOLUME RECONSTRUCTION

TECHNICAL FIELD

Examples described herein relate to data storage systems, and more specifically, to a system and method for migrating data between different data storage environments.

BACKGROUND

Data storage technology over the years has evolved from a direct attached storage model (DAS) to using remote computer storage models, such as Network Attached Storage (NAS) and Storage Area Network (SAN). With the direct storage model, the storage is directly attached to the workstations and applications servers, but this creates numerous difficulties with administration, backup, compliance, and maintenance of the directly stored data. These difficulties are alleviated at least in part by separating the application server/workstations form the storage medium, for example, using a computer storage network.

A typical NAS system includes a number of networked servers (e.g., nodes) for storing client data and/or other resources. The servers may be accessed by client devices (e.g., personal computing devices, workstations, and/or application servers) via a network such as, for example, the Internet. Specifically, each client device may issue data access requests (e.g., corresponding to read and/or write operations) to one or more of the servers through a network of routers and/or switches. Typically, a client device uses an IP-based network protocol, such as Common Internet File System (CIFS) and/or Network File System (NFS), to read from and/or write to the servers in a NAS system.

Conventional NAS servers include a number of data storage hardware components (e.g., hard disk drives, processors for controlling access to the disk drives, I/O controllers, and high speed cache memory) as well as an operating system and other software that provides data storage and access functions. In a conventional (e.g., 7-Mode) data storage environment, each server manages its own data. However, in a cluster-mode (e.g., C-Mode) environment, data may be distributed and managed across multiple servers. For example, individual storage containers may be created from a pool of hardware resources distributed among a node cluster. Thus, a particular node in a node cluster may be operable to manage data stored on other nodes in the cluster. Differences in data storage and management techniques may pose significant challenges when attempting to migrate data between different data storage environments.

SUMMARY

This Summary is provided to introduce in a simplified form a selection of concepts that are further described below in the Detailed Description. This summary is not intended to identify key features or essential features of the claimed subject matter, nor is it intended to limit the scope of the claimed subject matter.

In an aspect, a data migration system performs operations that include creating a first volume on a first storage system, and creating a logical unit within the first volume. The data migration system further creates a virtual volume on a virtual storage system associated with a second storage system such that data stored on the virtual volume is backed by the logical unit on the first storage system. The data migration system then replicates, on the virtual volume, a set of data stored on the second storage system. More specifically, any data copied and/or replicated to the virtual volume is automatically stored (e.g., by the virtual storage system) in the logical unit on the first storage system.

In some aspects, the set of data may be stored in a tree-based quota (qtree). Thus, in some aspects, the data migration system may replicate the set of data onto the virtual volume using a qtree replication function of the virtual storage system. For example, qtree replication function may correspond to a 7-to-7 qtree snapmirror, wherein the first storage system is a Cluster-Mode (C-Mode) system and the second storage system is a 7-Mode system.

In another aspect, the data migration system may further create a second volume on the first storage system. The data migration system may then copy a set of references associated with the set of data from the virtual volume to the second volume. For example, each reference in the set of references may point to a respective block of data in the first volume where at least a portion of the set of data is stored. In some aspects, the data migration system may copy the set of references to the second volume using a volume replication function of the virtual storage system. For example, the volume replication function may correspond to a 7-to-C volume snapmirror, wherein the first storage system is a C-Mode system and the second storage system is a 7-Mode system. Still further, in some aspects, the data migration system may copy the set of data from the logical unit to the second volume and subsequently delete the first volume.

By implementing a virtual volume on the second storage system backed by a logical unit on the first storage system, the data migration system effectively bridges the divide between the first and second storage systems. This allows data stored on the second storage system to be copied and/or migrated to the first storage system in a quicker and more efficient manner compared to conventional data migration techniques. Moreover, the data migration techniques herein are particularly advantageous for directly migrating data structures with interdependent storage elements (such as qtrees) between different data storage environments.

DETAILED DESCRIPTION

Figure 1:
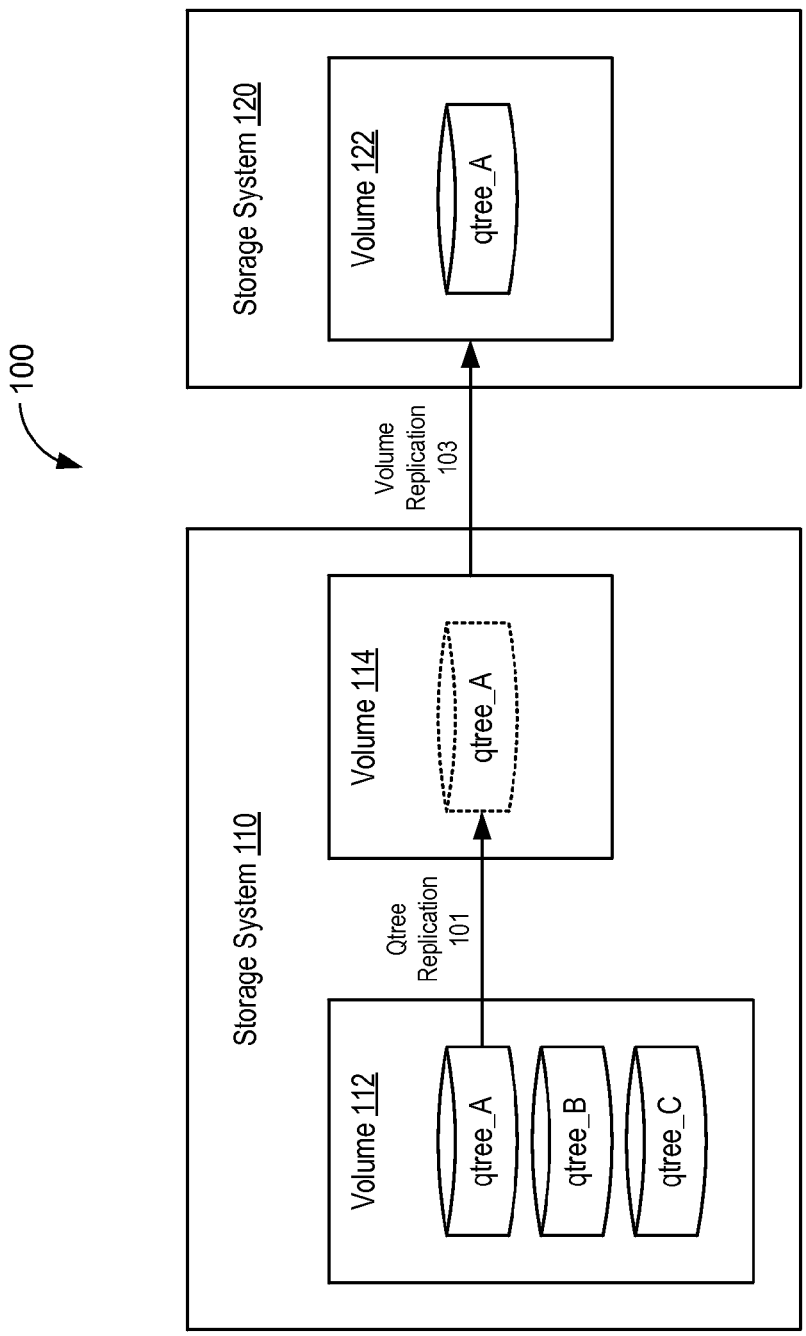
FIG. 1 illustrates a data migration procedure that may be used to move complex data structures between different storage environments.

Examples described herein include a computer system to migrate data directly between different data storage environments while preserving the organization of complex data structures. As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more aspects described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more aspects described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more aspects can be executed and/or carried. For example, a machine shown in one or more aspects includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets) and magnetic memory. Computers, terminals, and network-enabled devices (e.g. portable devices such as cell phones) are all examples of machines and devices that use processors, memory, and instructions stored on computer-readable mediums.

A "complex data structure" herein refers to a set of data having a complex organization or hierarchy and/or interdependent storage elements. A tree-based quota ("qtree") is an example of a complex data structure which functions as a directory (and/or sub-directory) within a data volume. For example, qtree are often used for sorting data stored within a volume. However, because the functionality of a qtree depends heavily on the organizational structure in which data is stored, it may be difficult to move a qtree from one storage system to another, particularly when the target storage system runs on a different environment than the originating storage system.

FIG. 1 illustrates a data migration procedure 100 that may be used to move complex data structures between different storage environments. Specifically, the data migration procedure 100 may be used to move a particular qtree (e.g., qtree_A) from one storage system (e.g., storage system 110) to a different storage system (e.g., storage system 120). For example, qtree_A may initially reside on a volume 112 (e.g., the "origin volume"), within storage system A, along with other data (e.g., qtree_B and qtree_C). In order to transfer qtree_A from the origin volume 112 to a volume 122 (e.g., the "target volume") on storage system 120, while preserving the functionality of qtree_A, the storage locations (e.g., block IDs) occupied by the corresponding qtree data in volume 112 would ideally map to the exact same storage locations in volume 122. However, it may be difficult, if not impossible, to guarantee the availability of such resources on the target volume 122.

In some aspects, storage system 120 may run on a different platform and/or environment (e.g., operating system) than storage system 110. For example, storage system 110 may correspond to a conventional (e.g., 7-Mode) storage system, while storage system 120 may correspond to a Cluster-Mode (C-Mode) storage system, for example, by NetApp, Inc. Thus, the data management (e.g., storage and/or access) techniques implemented by storage system 120 may differ from data management techniques implemented by storage system 110. This further adds to the complexity of replicating the organizational structure of a qtree from storage system 110 to storage system 120. For example, by attempting to directly copy the user (L0) data associated with qtree_A to an existing volume in storage system 120, such L0 data may end up in blocks that are unknown and/or inaccessible to qtree_A.

Thus, rather than attempt to directly copy the data from qtree_A to an existing volume in storage system 120, qtree_A may first be copied to a new volume 114 on storage system 110, for example, using an intra-platform qtree replication function 101. This effectively "isolates" qtree_A from other data (e.g., qtree_B and qtree_C) in volume 112. The entire volume 114 may then be copied to storage system 120, for example, using an inter-platform volume replication function 103. More specifically, the inter-platform volume replication function 103 may perform a block-to-block transfer of volume 114 to the target storage system 120 (e.g., which becomes volume 122), thus preserving the relationships (e.g., inode numbers) between L0 data in qtree_A.

As described above, the data management techniques implemented by storage system 120 may differ from those implemented by storage system 110. Accordingly, the presence of other data (e.g., qtree_B and qtree_C) in the same volume as qtree_A may affect the manner in which the qtree data is stored on storage system 120. However, isolating qtree_A within volume 114 helps reduce and/or eliminate these external variables.

It should be noted that the data migration procedure 100 may incur a high overhead cost. For example, the data migration procedure 100 may consume significant hardware resources, since a separate data volume must be allocated (on storage system 110) for each qtree to be moved to storage system 120. Furthermore, the data migration procedure 100 may consume a significant amount of time, since the process of moving each qtree from storage system 110 to storage system 120 requires at least two stages of data replication. Accordingly, it may be desirable to reduce the time and resources required to migrate data from one storage system to another.

Figure 2:
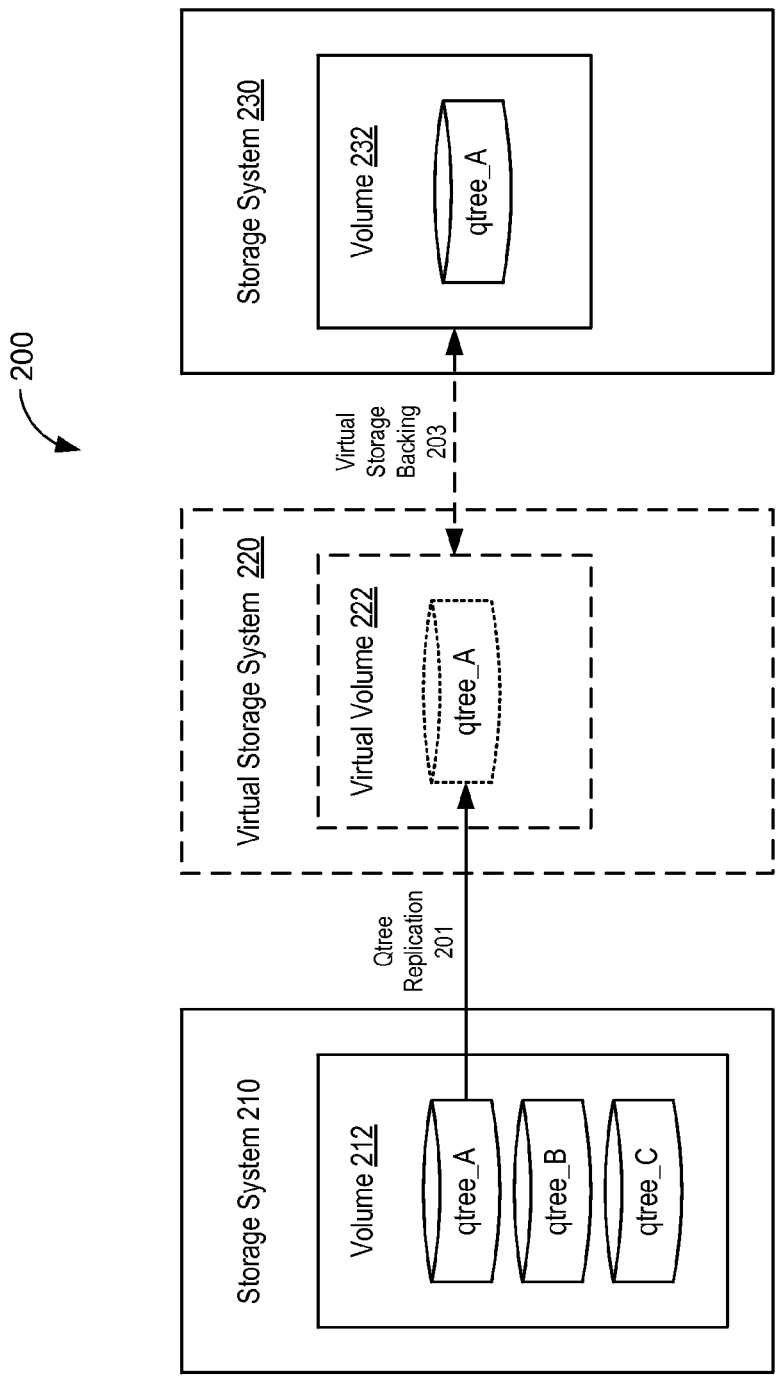
FIG. 2 illustrates an exemplary data migration procedure, in accordance with some aspects.

FIG. 2 illustrates an exemplary data migration procedure 200, in accordance with some aspects. Specifically, the data migration procedure 200 may be used to move a particular qtree (e.g., qtree_A) from a first storage system (e.g., storage system 210) to a second storage system (e.g., storage system 230). For example, qtree_A may initially reside on an origin volume 212 within storage system 210. The origin volume 212 may also store other data (e.g., qtree_B and qtree_C), in addition to qtree_A. In some aspects, storage system 230 may run on a different platform and/or environment than storage system 210. For example, storage system 210 may correspond to a 7-Mode system, while storage system 230 may correspond to a C-Mode system.

For some embodiments, a virtual volume 222 may be created on a virtual storage system (VSS) 220 associated with storage system 210. The VSS 220 is primarily software-based and may therefore be cheaper and/or more efficient to implement and operate than storage system 210 (e.g., which is implemented primarily in hardware). However, because they effectively perform the same functions and/or operations, the VSS 220 may be virtually indistinguishable from the storage system 210 to a client application. For some embodiments, the VSS 220 may correspond to a virtual storage appliance (VSA), for example, by NetApp, Inc.

Because the VSS 220 is a virtual machine, any data "stored" on the VSS 220 may have a physical storage counterpart. For example, data stored on the VSS 220 may be "backed by" the storage system 210. In other words, storage system 210 may provide a physical manifestation of data stored on the VSS 220. For some embodiments, the virtual volume 222 may be configured such that the data stored thereon is backed by a physical volume 232 on storage system 230. Accordingly, modifications to volume 232 (such as the addition and/or removal of data) are reflected in the virtual volume 222, and vice-versa.

For some embodiments, qtree_A may be migrated to storage system 230 using the virtual volume 222. For example, qtree_A may be copied to the virtual volume 222 using an intra-platform qtree replication function 201 of the VSS 220. In some aspects, the qtree replication function 201 may correspond to a 7-to-7 qtree snapmirror function of a V-series VSA. Once qtree_A is replicated onto the virtual volume 222 a corresponding copy of qtree_A may be created in volume 232 of storage system 230, due to virtual storage backing 203. For example, because the virtual volume 222 is backed by volume 232, the VSS 220 may programmatically store a physical copy of any L0 data associated with qtree_A in volume 232.

It should be noted that the virtual volume 222 effectively bridges the divide between storage system 210 and storage system 230. For example, because the virtual volume 222 is hosted on storage system 210, data stored on the storage system 210 may be replicated onto the virtual volume 222 using existing intra-platform data replication functions. Further, because the virtual volume 222 is backed by volume 232, any data replicated onto the virtual volume 222 may be stored (e.g., automatically) in the volume 232 of storage system 230. This allows complex data structures, such as qtrees, to be moved between storage system 210 and storage system 230 in a single step (e.g., using a single data replication operation).

Figure 3A:
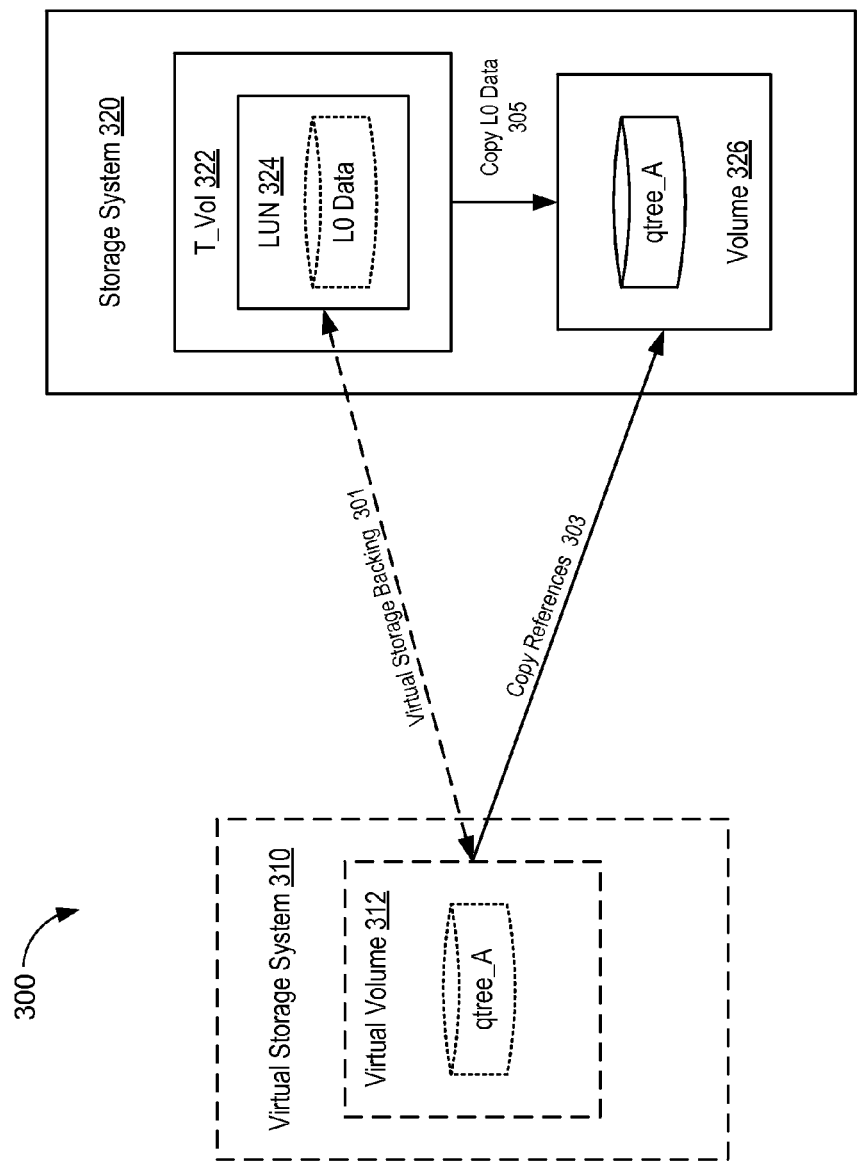
FIG. 3A-3B illustrate a more detailed aspect of the data migration procedure depicted in FIG. 2.
Figure 3B:
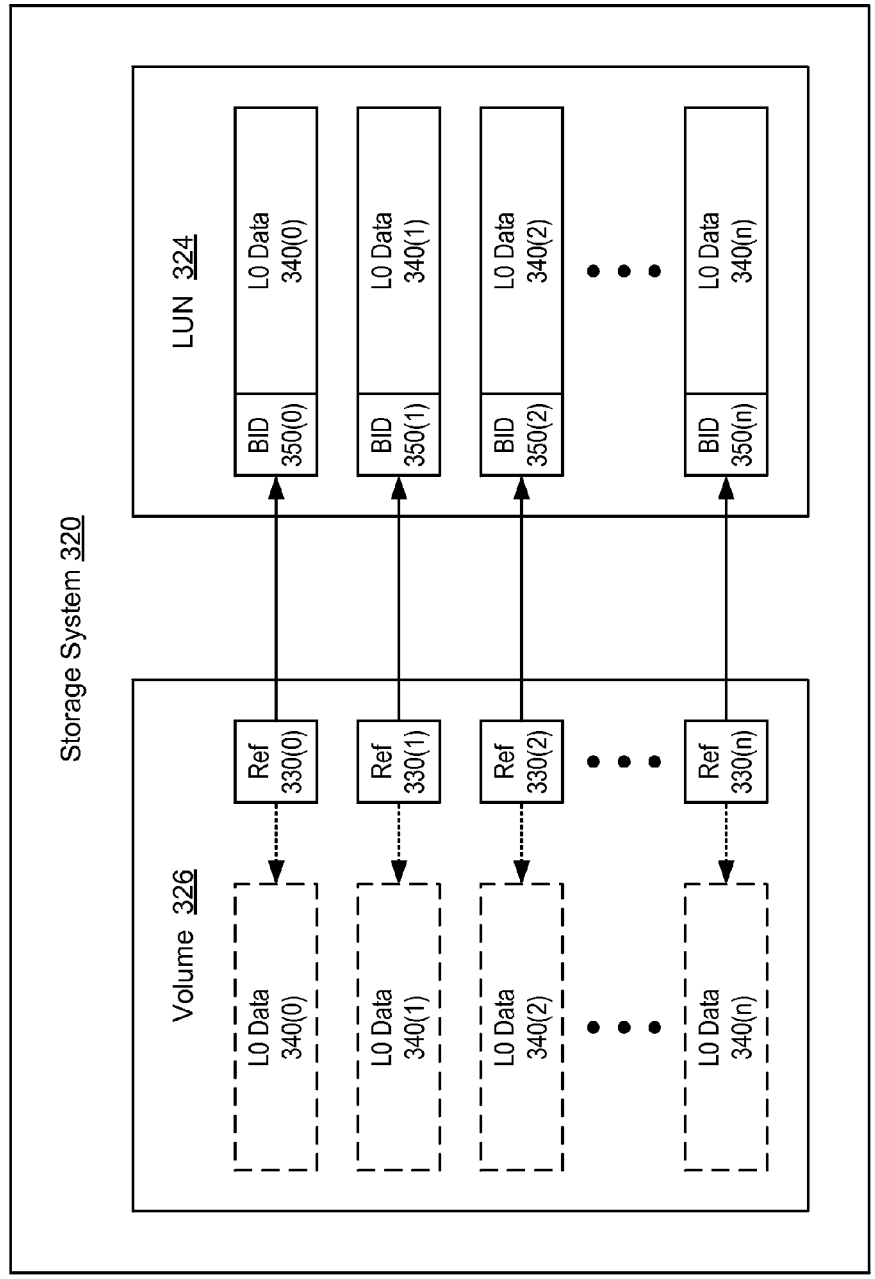

FIGS. 3A-3B illustrate a more detailed aspect of the data migration procedure depicted in FIG. 2. Specifically, the data migration procedure 300 may be used to move a qtree (e.g., qtree_A) to a target storage system (e.g., storage system 320) so that the qtree may be accessed directly via the target storage system. As described above, the data migration procedure 300 may be implemented using a virtual volume 312 formed on a virtual storage system (VSS) 310. More specifically, the VSS 310 may be hosted on an originating storage system (not shown for simplicity) from which data is to be transferred. In some aspects, the originating storage system may run on a different platform and/or environment than the target storage system 320. For example, the originating storage system may correspond to a 7-Mode system, while the target storage system 320 may correspond to a C-Mode system.

The virtual volume 312 is further backed by storage on the target storage system 320. For some embodiments, the virtual volume 312 may be backed by a logical unit (LUN) 324 formed within a temporary volume (T_Vol) 322 on the target storage system 320. A LUN is a logical representation of storage (e.g., a file) which may be treated as a disk. Unlike volumes, LUNs may be exported and/or mounted to an external device or application and treated as a local disk. For some embodiments, the LUN 324 is mounted to the VSS 310 and may be viewed by the VSS 310 as a local disk. This enables the virtual volume 312 to be backed by the LUN 324, even though the LUN 324 resides on the target storage system 320.

Once the virtual volume 312 (backed by LUN 324) has been established, qtree_A may then be copied to the virtual volume 312 (e.g., using an intra-platform qtree replication function). Upon replicating qtree_A on the virtual volume 312, a physical copy of the L0 data associated with qtree_A is stored in the LUN 324 due to virtual storage backing 301. The L0 data corresponds to the actual (e.g., user-accessible) data stored in qtree_A. At this point, the L0 data associated with qtree_A now resides in the LUN 324. Thus, qtree_A has effectively been migrated to the target storage system 320.

However, while the L0 data may be stored in the LUN 324, the references to that data (e.g., file system) are still contained in the virtual volume 312. Thus, it may be desirable to copy the references onto the target storage system 320 so that the L0 data may be accessed directly via the target storage system 320. For some embodiments, a volume 326 may be created on the target storage system 320 to store the corresponding references. Once the volume 326 is created, the references may be copied over from the virtual volume 312 using a data copy function 303. In some aspects, the data copy function 303 may correspond to a 7-to-C volume snapmirror function of a V-series VSA. At this point both the L0 data and the references used to access such data reside on storage system 320. Thus, the entire qtree_A may be accessed directly via the target storage system 320.

For example, as shown in FIG. 3B, volume 326 stores a number of references 330(0)-330(n) that point to corresponding block identifiers (BIDs) 350(0)-350(n), respectively, of the LUN 324. Furthermore, each the BIDs 350(0)-350(n) is associated with a storage location wherein a corresponding portion of the L0 data 340(0)-340(n) is stored. A user and/or client may access any of the L0 data 340(0)-340(n) stored in the LUN 324 via the references 330(0)-330(n). Thus, qtree_A is effectively replicated onto volume 326 and LUN 324.

For some embodiments, the L0 data 340(0)-340(n) and corresponding references 330(0)-330(n) may be consolidated onto a single volume. As described above, each of the references 330(0)-330(n) points to a respective BID 350(0)-350(n) which identifies a block of the LUN 324 wherein L0 data is stored. Thus, the blocks containing L0 data 340(0)-340(n) may be copied over to volume 326, for example, using a data copy function 305. More specifically, because the LUN 322 and the volume 326 are both provided on the target storage system 320, the data copy function 305 may copy the L0 data 330(0)-340(n) from LUN 322 to volume 326 in a manner that preserves the relationships between the L0 data 340(0)-340(n) and the references 330(0)-330(n). In some aspects, the data stored in the LUN 322 may be subsequently deleted (e.g., by punching a hole in the LUN 322 for each block copied over).

Once the L0 data is transferred from the LUN 324 to the volume 326, the entire qtree_A may be contained within a single volume on the target storage system 320. This may reduce the storage overhead for qtree_A while improving the efficiency of managing the qtree_A. In some aspects, the LUN 324 and associated T_Vol 322 may be deleted and/or deallocated to free up additional space on the target storage system 320.

Figure 4:
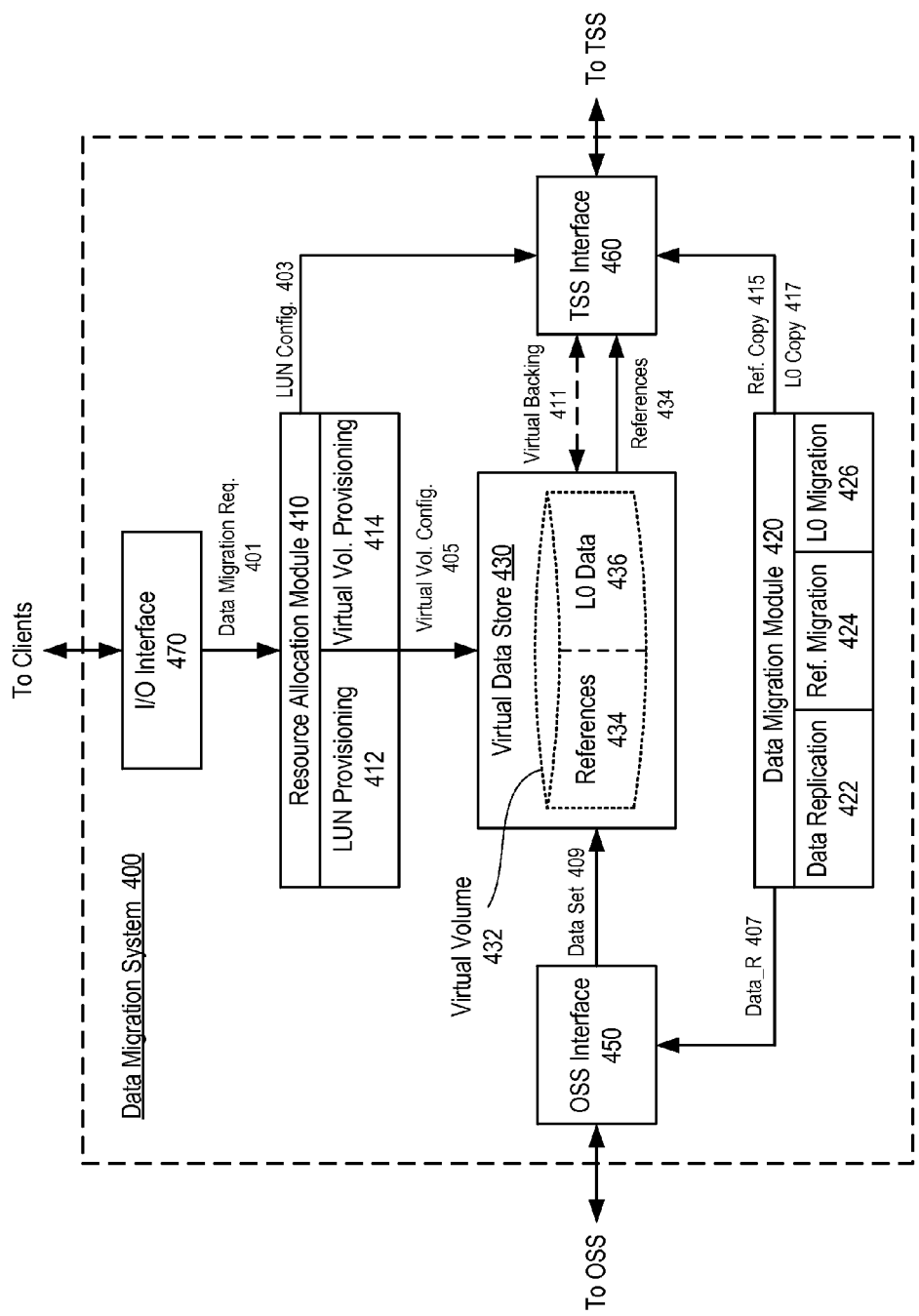
FIG. 4 illustrates a data migration system, in accordance with present aspects.

FIG. 4 illustrates a data migration system 400 that is operable to move complex data structures between different storage systems, in accordance with present aspects. The data migration system 400 may be implemented on an originating storage system ("OSS") and/or a target storage system ("TSS"). In some aspects, the data migration system 400 may be incorporated with a virtual storage system hosted by OSS. For example, with reference to FIG. 2, the data migration system 400 may be included with the VSS 220 associated with storage system 210. Alternatively, the data migration system 400 may be provided on a separate computing platform that is independent of both OSS and TSS.

The data migration system 400 includes a resource allocation module 410 and a data migration module 420. The resource allocation module 410 allocates resources on a TSS (and/or an OSS) in preparation for a data migration operation. For example, the resource allocation module 410 may receive data migration requests 401 (e.g., from a user and/or client device) via an input/output (I/O) interface 470. Specifically, the data migration request 401 may identify a set of data (residing on an OSS) to be transferred, as well as a target location (e.g., the TSS) for the transfer. For some embodiments, the data migration request 401 may further indicate the size of the data set to ensure that the resource allocation module 410 allocates sufficient storage space for the transfer.

For some embodiments, the resource allocation module 410 may include a LUN provisioning sub-module 412 and a virtual volume provisioning sub-module 414. The LUN provisioning sub-module 412 may create a LUN on the TSS with which to store a copy of the data set to be transferred. For example, the LUN provisioning sub-module 412 may output a set of LUN configuration instructions 403 to the TSS, via a TSS interface 460. More specifically, the LUN configuration instructions 403 may be used to create a temporary volume on the TSS, and to create a LUN within the temporary volume. The virtual volume provisioning sub-module 414 may then create a virtual volume with which to transfer the set of data to the LUN. For example, the virtual volume provisioning sub-module 414 may output a set of virtual volume configuration instructions 405 to a virtual volume data store 430. More specifically, the virtual volume configuration instructions 405 may be used to create a virtual volume 432 backed by the LUN created on the TSS. For some embodiments, the virtual data store may 430 may be hosted on the data migration system 400. Alternatively, the data migration system 400 may call upon an instance of the virtual data store 430 (e.g., which is hosted on an external application).

The data migration module 420 then transfers the data set from the OSS to the TSS. For some embodiments, the data migration module 420 may include a data replication sub-module 422, a reference migration sub-module 424, and an L0 data migration sub-module 426. The data replication sub-module 422 may replicate the data set (residing on the OSS) onto the virtual volume 432. For example, the data replication sub-module 422 may output a data replication (Data_R) instruction 407 to the OSS, via an OSS interface 450. More specifically, the Data_R instruction 407 may correspond to an intra-platform data replication function associated with the OSS (and/or the virtual data store 430). The OSS interface 450 may then transfer a data set 409 from the OSS to the virtual volume 432 (e.g., in response to the Data_R instruction 407).

The data set 409, as stored in the virtual volume 432, may include a set of references 434 and a set of L0 data 436. As described above, the L0 data 436 corresponds to user-accessible data, whereas the references 434 are used to identify and/or provide access to the L0 data 436. Since the virtual volume 432 is backed by a LUN on the TSS, any user data replicated onto the virtual volume 432 may be automatically copied to the associated LUN. For example, the virtual data store 430 may provide virtual backing instructions 411 to the TSS, via the TSS interface 460, which may be used to synchronize the virtual volume 432 with the LUN on the TSS. More specifically, the virtual backing instructions 411 may create a physical copy of the L0 data 436 in the associated LUN of the TSS.

The reference migration sub-module 424 may transfer the references 434 from the virtual volume 432 to physical storage on the TSS. For example, reference migration sub-module 424 may output reference copy instructions 415 to the TSS, via the TSS interface 460. More specifically, the reference copy instructions 415 may be used to copy the references 434 from the virtual volume 432 to a new volume on the TSS. For some embodiments, the reference copy instructions 415 may correspond to an inter-platform data replication function associated with the OSS (and/or the virtual data store 430). Further, for some embodiments, the reference copy instructions 415 may also include instructions to create the new volume on the TSS.

The L0 data migration sub-module 426 may transfer the L0 data 436 from the LUN backing the virtual volume 432 to the new volume (on the TSS) on which the references 434 are stored. For example, the L0 data migration sub-module 426 may output L0 copy instructions 417 to the TSS, via the TSS interface 460. More specifically, the L0 copy instructions 417 may be used to copy the L0 data 436 from the LUN to the new volume while preserving the relationships between the references 434 and the L0 data 436. For some embodiments, the L0 copy instructions 417 may correspond to an intra-platform data replication function associated with the TSS. Further, for some embodiments, the L0 copy instructions 417 may include instructions to delete and/or deallocate the LUN backing the virtual volume 432, as well as the volume in which the LUN resides.

Figure 5A:
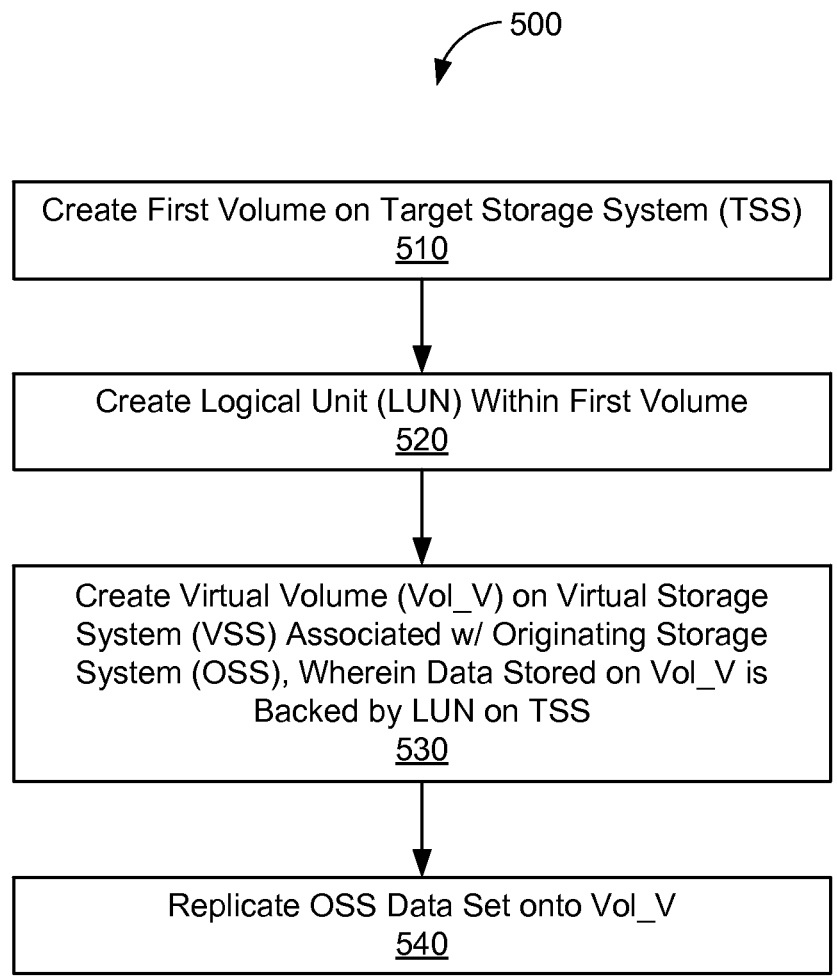
FIGS. 5A-5B illustrate a method for migrating data between different data storage environments.
Figure 5B:
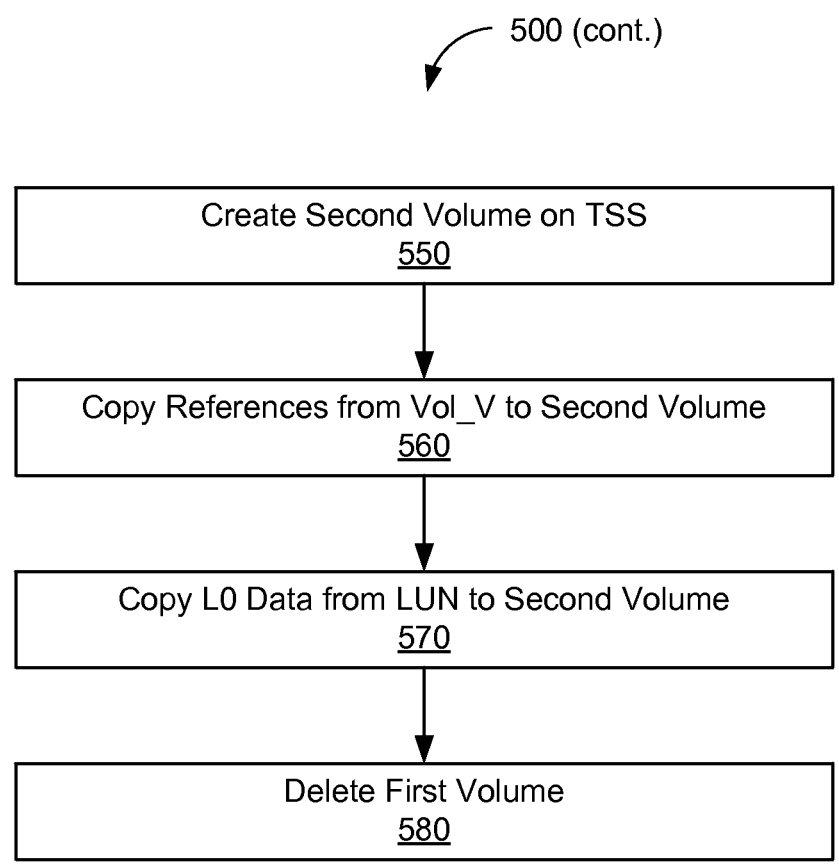

FIGS. 5A-5B illustrate a method 500 for migrating data between different data storage environments. Examples such as described with FIGS. 5A-5B can be implemented using, for example, a system such as described with FIGS. 2-4. Accordingly, reference may be made to elements of FIGS. 2-4 for purposes of illustrating suitable elements and/or components for performing a step or sub-step being described. More specifically, the method 500 may be implemented, for example, by the data migration system 400 as described above with respect to FIG. 4.

The data migration system 400 creates a first volume on a target storage system (510), and further creates a LUN within the first volume of the TSS (520). For example, the LUN provisioning sub-module 412 may generate a set of LUN configuration instructions 403 which may be used to create a temporary volume (e.g., T_Vol 322 of FIG. 3) on the TSS (e.g., storage system 320), and to create a LUN (e.g., LUN 324) within the temporary volume. For some embodiments, the size of the LUN and/or the temporary volume may depend on the size of the data set to be transferred. For example, the resource allocation module 410 may determine the size of the data set based on a data migration request 401 received from a user and/or client device.

The data migration system 400 further creates a virtual volume on a virtual storage system associated with the originating storage system (530). For example, the virtual volume provisioning sub-module 414 may generate a set of virtual volume configuration instructions 405 which may be used to create a virtual volume 432, on a virtual data store 430, backed by the LUN created on the TSS (e.g., LUN 324). For some embodiments, the virtual data store 430 may be hosted on the data migration system 400. Alternatively, the data migration system 400 may call upon an instance of the virtual data store 430 (e.g., which is hosted on an external application).

The data migration system 400 then replicates a data set, residing on the OSS, onto the virtual volume (540). For example, the data replication sub-module 422 may generate a data replication instruction 407 which may be used to transfer a data set 409 from the OSS (e.g., storage system 210 of FIG. 2) to the virtual volume 432. For some embodiments, the data set 409 may correspond to a qtree. More specifically, the Data_R instruction 407 may correspond to an intra-platform data replication function associated with the OSS (e.g., a 7-to-7qtree snapmirror).

As described above, the data set 409 may include a set of references 434 and a corresponding set of L0 data 436. Since the virtual volume 432 is backed by the LUN on the TSS (e.g., LUN 324) any user data replicated onto the virtual volume 432 may be automatically copied to the associated LUN. More specifically, the virtual data store 430 may provide virtual backing instructions 411 to the TSS to create a physical copy of the L0 data 436 in the associated LUN. At this point, the L0 data 436 associated with the data set 409 has effectively been migrated to the TSS (e.g., storage system 320). For some embodiments, the data migration system 400 may further transfer the set of references 434 to the TSS, to enable the entire data set 409 to be access via the TSS (e.g., as illustrated in FIG. 5B).

With reference to FIG. 5B, the data migration system 400 may create a second volume on the TSS (550), and copy the references from the virtual volume to the second volume (560). For example, the reference migration sub-module 424 may generate a set of reference copy instructions 415 which may be used to copy the references 434 from the virtual volume 432 to a new volume on the TSS (e.g., volume 326 of FIG. 3). The reference copy instructions 415 may also include instructions to create the new volume on the TSS. For some embodiments, the reference copy instructions may correspond to an inter-platform data replication function associated with the OSS (e.g., a 7-to-C volume snapmirror).

The data migration system 400 may then copy the L0 data from the LUN on the TSS to the second volume (570). For example, the L0 migration sub-module 426 may generate a set of L0 copy instructions 417 which may be used to copy the L0 data 436 from the LUN to the new volume while preserving the relationships between the references 434 and the L0 data 436. For some embodiments, the L0 copy instructions 417 may correspond to an intra-platform data replication function associated with the TSS (e.g., a C-to-C volume snapmirror).

Finally, the data migration system may delete and/or deallocate the first volume on the TSS (580). For example, once the entire data set 409 (e.g., including both the references 434 and L0 data 436) is contained within the second volume (e.g., volume 326), the data stored in the LUN backing the virtual volume 432 (e.g., LUN 324) may be redundant. Thus, for some embodiments, the L0 copy instructions 417 may further include instructions to delete and/or deallocate the LUN on the TSS (e.g., LUN 324), as well as the temporary volume (e.g., T_Vol 322) in which the LUN resides.

Figure 6:
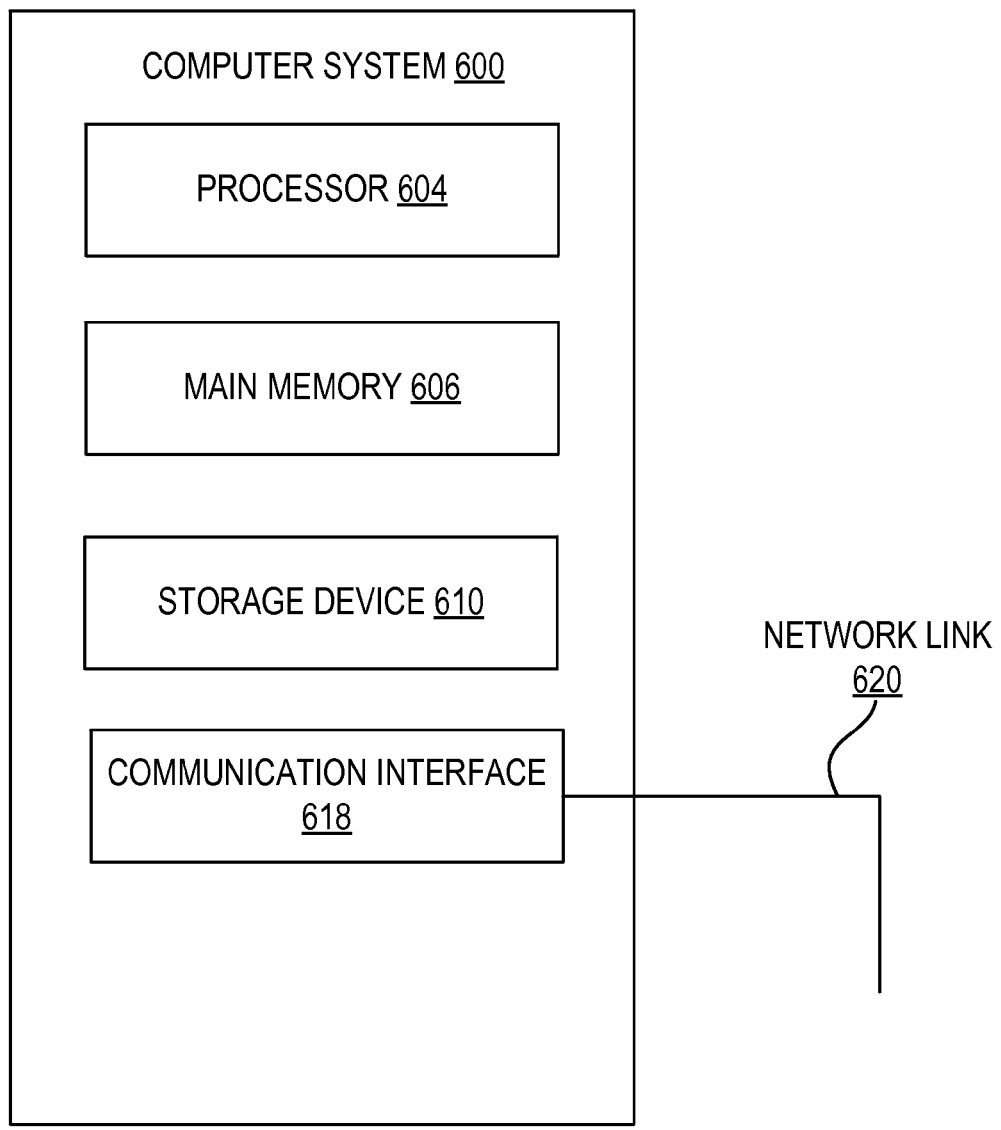
FIG. 6 is a block diagram that illustrates a computer system upon which aspects described herein may be implemented.

FIG. 6 is a block diagram that illustrates a computer system upon which aspects described herein may be implemented. For example, in the context of FIG. 4, the data migration system 400 may be implemented using one or more computer systems such as described by FIG. 6. In addition, methods such as described with FIGS. 5A-5B can be implemented using a computer such as described with an example of FIG. 6.

In some aspects, computer system 600 includes processor 604, memory 606 (including non-transitory memory), storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. A storage device 610, such as a magnetic disk or optical disk, is provided for storing information and instructions. The communication interface 618 may enable the computer system 600 to communicate with one or more networks through use of the network link 620 (wireless or wireline).

In one implementation, memory 606 may store instructions for implementing functionality such as described with an example of FIG. 4, or implemented through an example method such as described with FIGS. 5A-5B. Likewise, the processor 604 may execute the instructions in providing functionality as described with FIG. 4 or performing operations as described with an example method of FIGS. 5A-5B.

Examples described herein are related to the use of computer system 600 for implementing the techniques described herein. According to one aspect, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative examples have been described in detail herein with reference to the accompanying drawings, variations to specific aspects and details are encompassed by this disclosure. It is intended that the scope of aspects described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A method of data migration, the method comprising:
    creating a logical unit within a temporary volume on a destination storage system;
    creating a virtual volume on a virtual storage system associated with a source storage system;
    mounting the logical unit onto the virtual storage system so that a set of data from the source storage system replicated to the virtual volume is written to the temporary volume on the destination storage system;
    creating a destination volume on the destination storage system; and
    for each block in the set of data:
    identifying a respective block within the logical unit using a reference from the virtual storage system;
    copying the respective block from the temporary volume to the destination volume; and
    deleting the respective block from the temporary volume, wherein:
    the source storage system is a first storage environment and stores the set of data in a first organizational structure and the destination storage system is a second storage environment and stores the set of data in a second organizational structure different from the first organizational structure; and
    at least one of the first organizational structure and the second organizational structure further comprises one or more data structures functioning as interdependent storage elements.

2. The method of claim 1, wherein the set of data is stored in a tree-based quota (qtree).

3. The method of claim 2, wherein replicating the set of data comprises:
    replicating the set of data onto the virtual volume using a qtree replication function of the virtual storage system.

4. The method of claim 3, wherein the destination storage system is a Cluster-Mode (C-Mode) system and the source storage system is a 7-Mode system, and
    wherein the qtree replication function corresponds to a 7-to-7 qtree snapmirror.

5. A data migration system comprising:
    a memory containing machine readable medium comprising machine executable code having stored thereon;
    a processing module, coupled to the memory, to execute the machine executable code to:
    create a logical unit within a temporary volume on a destination storage system;
    create a virtual volume on a virtual storage system associated with a source storage system;
    mount the logical unit onto the virtual storage system so that a set of data from the source storage system replicated to the virtual volume is written to the temporary volume on the destination storage system;
    create a destination volume on the destination storage system; and
    for each block in the set of data:
    identify a respective block within the logical unit using a reference from the virtual storage system;
    copy the respective block from the temporary volume to the destination volume; and
    delete the respective block from the temporary volume, wherein:
    the source storage system is a first storage environment and stores the set of data in a first organizational structure and the destination storage system is a second storage environment and stores the set of data in a second organizational structure different from the first organizational structure; and
    at least one of the first organizational structure and the second organizational structure further comprises one or more data structures functioning as interdependent storage elements.

6. The data migration system of claim 5, wherein the set of data is stored in a tree-based quota (qtree).

7. The data migration system of claim 6, wherein the processing module is to replicate the set of data by:
    replicating the set of data on the virtual volume using a qtree replication function of the virtual storage system.

8. The data migration system of claim 7, wherein the destination storage system is a Cluster-Mode (C-Mode) system and the source storage system is a 7-Mode system, and wherein the qtree replication function corresponds to a 7-to-7 qtree snapmirror.

9. A non-transitory computer-readable medium for implementing data migration between storage systems, the non-transitory computer-readable medium storing instructions that, when executed by one or more processors, cause the one or more processors to perform operations comprising:
    creating a logical unit within a temporary volume on a destination storage system;
    creating a virtual volume on a virtual storage system associated with a source storage system;
    mounting the logical unit onto the virtual storage system so that a set of data from the source storage system replicated to the virtual volume is written to the temporary volume on the destination storage system;
    creating a destination volume on the destination storage system; and
    for each block in the set of data:
    identifying a respective block within the logical unit using a reference from the virtual storage system;
    copying the respective block from the temporary volume to the destination volume; and
    deleting the respective block from the temporary volume, wherein:
    the source storage system is a first storage environment and stores the set of data in a first organizational structure and the destination storage system is a second storage environment and stores the set of data in a second organizational structure different from the first organizational structure; and
    at least one of the first organizational structure and the second organizational structure further comprises one or more data structures functioning as interdependent storage elements.

* * * * *